United States Patent
Cherry et al.

(10) Patent No.: US 9,953,303 B2
(45) Date of Patent: Apr. 24, 2018

(54) TIME TRACKING DEVICE AND METHOD

(71) Applicant: ZR Investments, LLC, Carrollton, TX (US)

(72) Inventors: Rocky Cherry, Carrollton, TX (US); Zack Cherry, Carrollton, TX (US); David Hess, Dallas, TX (US)

(73) Assignee: ZR Investments, LLC, Carrollton, TX (US)

( * ) Notice: Subject to any disclaimer, the term of this patent is extended or adjusted under 35 U.S.C. 154(b) by 344 days.

(21) Appl. No.: 14/788,158

(22) Filed: Jun. 30, 2015

(65) Prior Publication Data

US 2015/0302362 A1 Oct. 22, 2015

Related U.S. Application Data

(63) Continuation-in-part of application No. 13/855,409, filed on Apr. 2, 2013, now Pat. No. 9,070,162.

(60) Provisional application No. 61/638,399, filed on Apr. 25, 2012.

(51) Int. Cl.
  *G07B 17/00* (2006.01)
  *G06Q 10/10* (2012.01)
  *G07C 1/10* (2006.01)
  *G06F 15/173* (2006.01)

(52) U.S. Cl.
  CPC .......... *G06Q 10/1091* (2013.01); *G07C 1/10* (2013.01)

(58) Field of Classification Search
  USPC .......................................................... 705/30
  See application file for complete search history.

(56) References Cited

U.S. PATENT DOCUMENTS

| 4,819,162 A * | 4/1989 | Webb, Jr. ............ G06Q 10/109 235/377 |
| 5,550,359 A | 8/1996 | Bennett |
| 5,717,867 A | 2/1998 | Wynn et al. |
| 7,114,648 B2 * | 10/2006 | Ginskey ............ G06Q 10/1091 235/377 |
| 7,233,919 B1 * | 6/2007 | Braberg ................. G06Q 10/10 705/32 |
| 7,333,718 B2 | 2/2008 | Yoshikawa et al. |
| 7,343,316 B2 * | 3/2008 | Goto ..................... G06Q 10/06 705/7.16 |
| 7,367,491 B2 | 5/2008 | Cheng et al. |
| 7,400,258 B2 | 7/2008 | Crespo |

(Continued)

FOREIGN PATENT DOCUMENTS

AU   WO2007106945   9/2007

*Primary Examiner* — Ashford S Hayles
(74) *Attorney, Agent, or Firm* — Suiter Swantz pc llo

(57) ABSTRACT

A system and method to manage employee time at a set of job sites. A time management system comprises a server in communications with a database in which a set of job site data is stored. An employee device application is installed on a set of employee devices. The set of employee devices are in communication with the server through the employee device application. The set of employee devices collect a set of time punch data and a set of photos from the set of employees at check-in events and check-out events. The set of time punch data and the set of photos are sent to the server and stored in the database with the set of job site data. A supervisor management application is installed on a set of supervisor devices to monitor the set of job site data, validate photos and activate employee devices.

14 Claims, 17 Drawing Sheets

Operation at job site with Wi-Fi authentication

(56) References Cited

U.S. PATENT DOCUMENTS

| | | |
|---|---|---|
| 7,489,595 B2 | 2/2009 | King et al. |
| 8,036,961 B2 | 10/2011 | Ducolon et al. |
| 9,070,162 B2 | 6/2015 | Cherry et al. |
| 2002/0030582 A1* | 3/2002 | Depp ............... G07C 1/10 340/5.53 |
| 2002/0175211 A1* | 11/2002 | Dominguez ....... G06K 17/0022 235/492 |
| 2004/0019542 A1* | 1/2004 | Fuchs ............... G06Q 10/1091 705/32 |
| 2004/0093256 A1* | 5/2004 | Garcia ......... G06Q 10/063116 705/7.16 |
| 2005/0108553 A1 | 5/2005 | Jakubowski |
| 2005/0109836 A1* | 5/2005 | Ben-Aissa ......... G06K 9/00087 235/380 |
| 2005/0131745 A1* | 6/2005 | Keller ............... G06Q 10/04 705/7.15 |
| 2006/0010051 A1 | 1/2006 | Sattler et al. |
| 2007/0094109 A1 | 4/2007 | Perry |
| 2007/0168488 A1* | 7/2007 | Deguchi ............. G06Q 10/06 709/223 |
| 2008/0114683 A1* | 5/2008 | Neveu ............... G06Q 10/06 705/50 |
| 2008/0177646 A1* | 7/2008 | Frink ................ G06Q 10/1091 705/32 |
| 2009/0127328 A1* | 5/2009 | Aissa ................ G06K 9/00087 235/377 |
| 2009/0157537 A1 | 6/2009 | Miller |
| 2009/0177688 A1* | 7/2009 | Karlsen ............. G06Q 10/06 |
| 2009/0193055 A1* | 7/2009 | Kuberka ............ G06F 17/3028 |
| 2009/0204434 A1* | 8/2009 | Breazeale, Jr. ....... G06F 19/327 705/3 |
| 2009/0232366 A1* | 9/2009 | Okochi ............. G06Q 10/10 382/119 |
| 2009/0254464 A1 | 10/2009 | Bonner et al. |
| 2010/0082465 A1 | 4/2010 | Drucker et al. |
| 2010/0150117 A1* | 6/2010 | Aweya ................ G01S 5/14 370/338 |
| 2010/0279713 A1* | 11/2010 | Dicke ............... H04M 1/72572 455/457 |
| 2010/0312606 A1 | 12/2010 | Gala |
| 2010/0324964 A1* | 12/2010 | Callanan ............ G06Q 10/06 705/322 |
| 2011/0082777 A1 | 4/2011 | Chess |
| 2011/0112943 A1* | 5/2011 | Dietz ............... G06Q 10/06 705/32 |
| 2011/0153477 A1* | 6/2011 | Niazi ................ G06Q 10/10 705/32 |
| 2011/0276445 A1* | 11/2011 | Chess ............... G06Q 10/06 705/32 |
| 2012/0095779 A1* | 4/2012 | Wengrovitz ......... G06F 19/327 705/3 |
| 2012/0233044 A1* | 9/2012 | Burger .............. G06Q 10/06 705/32 |
| 2013/0006718 A1* | 1/2013 | Nielsen ........... G06Q 10/06312 705/7.42 |
| 2013/0017840 A1* | 1/2013 | Moeglein ........... G01S 5/0205 455/456.1 |
| 2013/0024334 A1* | 1/2013 | Kozlay .......... G06Q 10/063114 705/32 |
| 2013/0085861 A1* | 4/2013 | Dunlap ............... G01S 19/34 705/14.58 |
| 2013/0179315 A1* | 7/2013 | Feliciano Lopez ...... G07C 1/06 705/32 |
| 2013/0246114 A1* | 9/2013 | Gala ................ G06Q 10/06 705/7.15 |
| 2013/0290154 A1* | 10/2013 | Cherry .............. G06Q 40/00 705/32 |
| 2015/0120342 A1* | 4/2015 | Dragon .............. G06Q 10/02 705/5 |

\* cited by examiner

Operation at job site using web browser

Operation at job site with Wi-Fi authentication

Operation at job site using landmark at job site

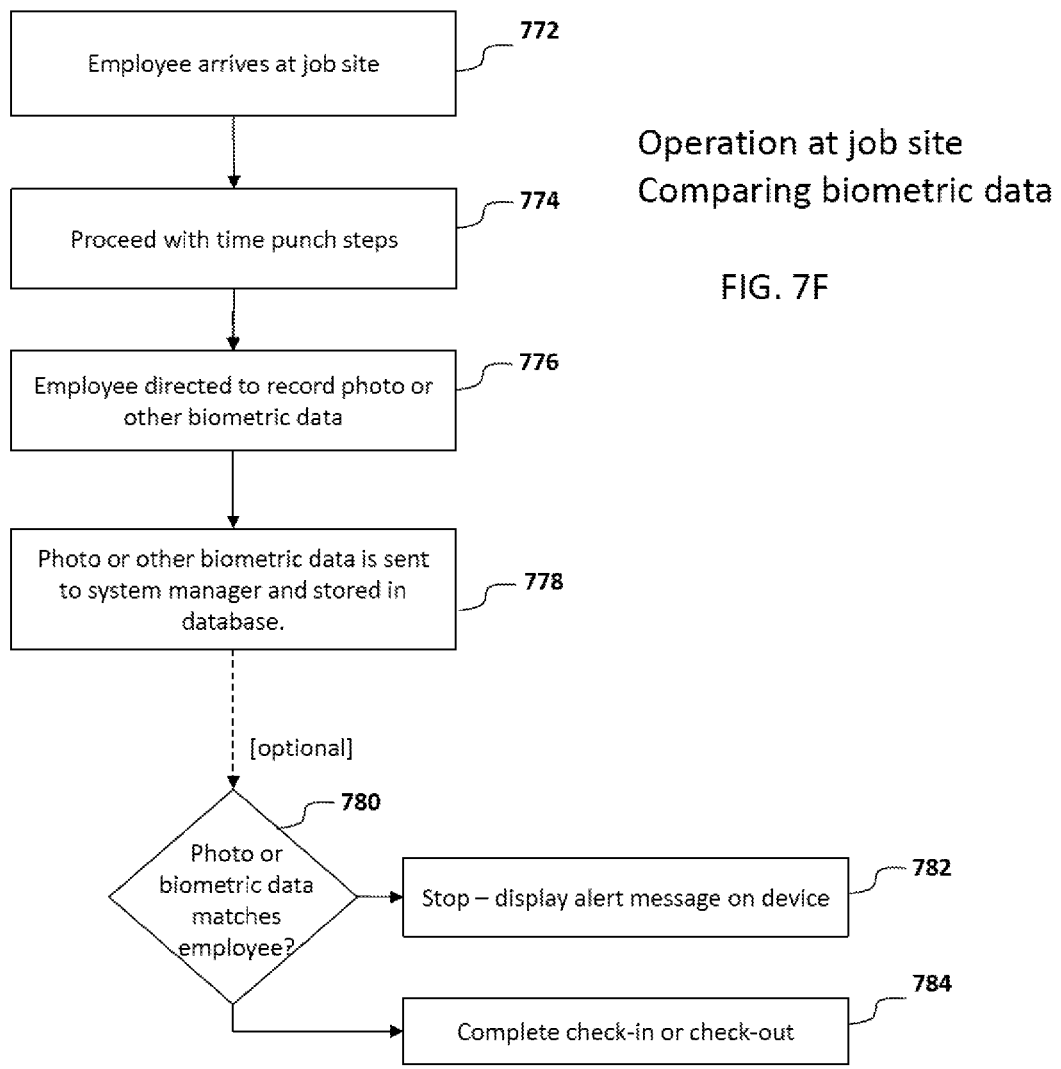

| Job 1211 | Day 1212 | Expected Hours 1213 | Actual Hours 1214 | Job Regular Time 1216 | Overtime 1218 | Overtime Hours Remaining 1220 | Regular Time Hours Remaining 1221 |
|---|---|---|---|---|---|---|---|
| | | | | | | 3 | 40 |
| 1 | Monday | 4 | 6 | 4 | 2 | 1 | 36 |
| 2 | Monday | 5 | 5 | 5 | 0 | 1 | 31 |
| 2 | Tuesday | 7 | 8 | 7 | 1 | 0 | 24 |
| 3 | Tuesday | 3 | 2 | 2 | 0 | 0 | 22 |
| 3 | Wednesday | 5 | 8 | 8 | 0 | 0 | 14 |
| 1 | Thursday | 2 | 10 | 10 | 0 | 0 | 4 |
| 2 | Friday | 4 | 2 | 2 | 0 | 0 | 2 |
| 3 | Friday | 6 | 2 | 2 | 0 | 0 | 0 |
| TOTAL | | | 43 | 40 | 3 | | |

| Job | Day | Expected Hours | Actual Hours | Job Regular Time | Overtime | Overtime Hours Remaining | Regular Time Hours Remaining |
|---|---|---|---|---|---|---|---|
| | | | | | | | 40 |
| 1 | Monday | 4 | 10 | 4 | 6 | 7 | 36 |
| 2 | Monday | 5 | 4 | 4 | 0 | 7 | 31 |
| 2 | Tuesday | 7 | 10 | 7 | 3 | 4 | 24 |
| 3 | Tuesday | 3 | 5 | 3 | 2 | 2 | 22 |
| 3 | Wednesday | 5 | 7 | 5 | 2 | 0 | 14 |
| 1 | Thursday | 2 | 4 | 4 | 0 | 0 | 4 |
| 2 | Friday | 4 | 5 | 5 | 0 | 0 | 2 |
| 3 | Friday | 6 | 8 | 8 | 0 | 0 | 0 |
| TOTAL | | | 53 | 40 | 13 | | |

FIG. 12B

| Job | Day | Expected Hours | Actual Hours | Job Regular Time | Overtime | Overtime Hours Remaining | Regular Time Hours Remaining |
|---|---|---|---|---|---|---|---|
| | | | | | | | 40 |
| 3 | Monday | 4 | 5 | 4 | 1 | 11 | 36 |
| 2 | Monday | 5 | 7 | 5 | 2 | 10 | 31 |
| 1 | Tuesday | 8 | 2 | 2 | 0 | 8 | 24 |
| 3 | Tuesday | 3 | 7 | 3 | 4 | 8 | 22 |
| 2 | Wednesday | 8 | 8 | 8 | 0 | 4 | 14 |
| 1 | Thursday | 2 | 10 | 6 | 4 | 4 | 4 |
| 1 | Friday | 3 | 4 | 4 | 0 | 0 | 2 |
| 3 | Friday | 6 | 8 | 8 | 0 | 0 | 0 |
| TOTAL | | | 51 | 40 | 11 | | |

FIG. 12C

TIME TRACKING DEVICE AND METHOD

CROSS-REFERENCE TO RELATED APPLICATIONS

This application is a continuation in part of U.S. application Ser. No. 13/855,409, filed Apr. 2, 2013, which claims priority benefit from U.S. Provisional Patent Application No. 61/638,399, filed on Apr. 25, 2012. Each patent application identified above is incorporated herein by reference in its entirety to provide continuity of disclosure.

FIELD OF THE INVENTION

This invention relates to a system and method for employee time tracking at a set of job sites.

BACKGROUND OF THE INVENTION

In general, the art of the invention is employee time clocks for construction sites. It is known in the art to have an employee punch a time card upon arriving and when leaving a job site. However, punching a time card requires that a physical card be handled by several people without being lost. Furthermore, a time card based system does not allow for remote supervision and management of a job site as can often be the case when supervising multiple construction sites.

In the construction industry, overtime can change depending on job site location, time of the year, time of day, weather and job parameters. Currently, time clocks of the prior art do not account for each of these changes in calculating overtime. Furthermore, overtime is not sufficiently monitored and managed in many organizations leading to lower productivity and higher costs.

Also, in the construction industry, many worksites are remote from computer networks, so simply automating a time punch system at the site is not often feasible. This is especially true in the early stages of construction projects where electricity is not even available except through generators.

The prior art is lacking an ability to account for an employee reporting to multiple job sites under multiple job numbers, job phases and cost codes. In the construction industry, such multiple reporting can happen in a single day. For example it may be possible to have an employee clock in at two job sites, but only work at one job site for the day, while getting credit for work hours from both job sites.

In the prior art, U.S. Pat. No. 5,550,359 to Bennett discloses a system and method for recording employee time and attendance information. A user identification document contains identification information in the form of a bar code. The user places the document in a region of a reader which scans and stores the identification information. A host computer is connected to the reader and periodically polls the reader to obtain the identification information. The system records a video image of the user as the bar code is scanned.

A timesheet reporting and extraction system is disclosed in U.S. Patent Publication No. 2004/0019542 to Fuchs et al. The timesheet reporting and extraction system accepts time entry data from a first user using a first computing device. The time entry data is compared to a pre-defined work schedule and discrepancies are noted for overtime and other adjustments. Timesheet information is uploaded to a web server for database storage. A second user approves timesheet entries using a second computing device. The first and second computing devices can be collocated with the web server or remote from the web server.

U.S. Pat. No. 7,367,491 to Cheng et al. discloses a system for dynamically controlling attendance of a group of employees of an organization. The system comprises a plurality of client computers, a corporation website, an application server and a database. Each client computer provides an interactive user interface for any of the employees to log on to the corporation website in order to process attendance operations, including recording an arrival time and a departure time for each employee. A qualified supervisor is enabled to obtain information relating to the employees.

U.S. patent application Ser. No. 2011/0082777 to Chess discloses a time keeping computer system comprising a time keeper photo data base, time clock photo program, camera image device, payroll program, computer, camera, clock in time, and clock out time. The camera captures an image of an employee upon clock-in and clock-out by the employee. The computer maintains an earlier image of the employee.

SUMMARY

In the present disclosure, a system for employee time management at a set of job sites is disclosed. The system comprises a computer server communicatively connected to a database, the computer server comprising a first processor. A first set of program instructions execute on the first processor to receive a set of time punch data and store the set of time punch data in the database.

The system further comprises an employee device having a camera means, in communications with the computer server, having a second processor. A second set of program instructions execute on the second processor to generate the set of time punch data in response to at least one time punch event and send the set of time punch data to the computer server.

The set of time punch data comprises a date, a check-in time, a check-out time, a job number, a job phase and a cost code.

The employee device is directed to store a photo from the camera means into a memory of the employee device, wherein the photo comprises an image of a landmark feature of a job site and an image of an employee. The employee device is further directed to send the photo to the computer server. The computer server is directed to receive the photo from the employee device and store the photo in the database.

In another aspect of the present disclosure, the computer server is further directed to determine a job site location from the landmark feature of the job site and compare the job site location to an expected job site location.

A method of employee time management at set of job sites is disclosed. A time management server is provided and placed in communications with a database and stores a set of job site data for the set of job sites in the database. An employee device is configured with a device application for managing a set of time punch data for an employee. The employee device then authenticates with the time management server.

At a job site, the employee device generates the set of time punch data for a work shift, wherein the set of time punch data comprises a date, a check-in time, a check-out time, a device identifier, a job number and a job phase. The employee device further operates a camera function in response to a time punch event, receiving a photo of the employee from the camera function. The employee device sends the set of time punch data and the photo to the time management server which causes the set of time punch data and the photo to be stored in the database.

The photo is compared to an archived photo of the employee to insure that the employee actually checked in and out of the job site for the work shift.

BRIEF DESCRIPTION OF THE DRAWINGS

In the detailed description of the preferred embodiments presented below, reference is made to the accompanying drawings.

FIG. 7F is a flow chart of a time punch process using biometric information.

FIGS. 12A-12C are a set of example time records and related calculations for three employees.

DETAILED DESCRIPTION

Figure 1:
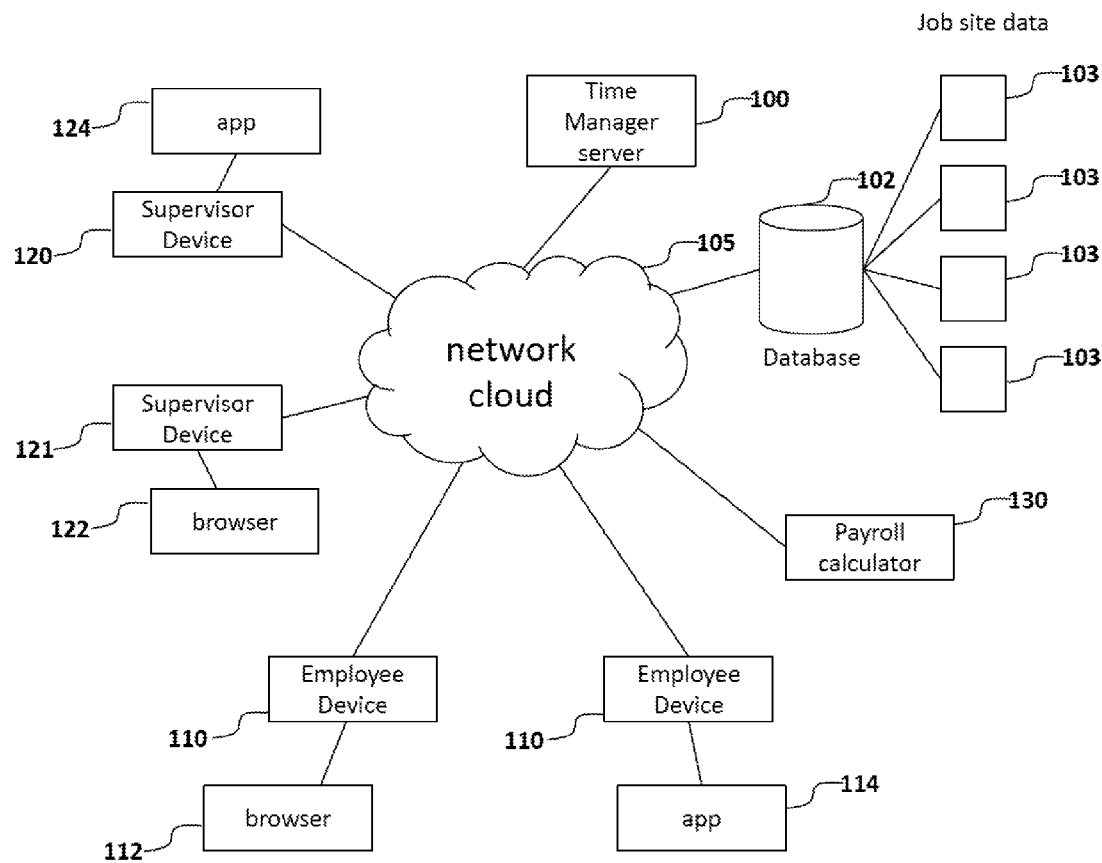
FIG. 1 is a block diagram of a preferred embodiment of time management system.

Reference will now be made in detail to the present embodiments of the present invention, examples of which are illustrated in the accompanying drawings, wherein like reference numerals refer to the like elements throughout. The embodiments are described below to explain the present invention by referring to the figures.

Computers, servers, laptops and mobile communication devices consist of processors operating stored program operating environments, user input and display interfaces and network connections. A set of stored programs, when executed by the processors, provide users with network functionality, for instance, to access another device and to establish remote sessions on another device through the Internet and to send and receive time punch information, employee data, job site data, etc.

A web service is a method of communication between two electronic devices over the Internet A web services application is a software function provided at a network address over a network cloud that is "always on". The web services application is designed to support interoperable machine-to-machine interaction over a network and through an interface description in a machine-processable format. Systems interact with the web service in a manner prescribed by its interface description, for example with messages conveyed using HTTP in conjunction with other web-related standards. In a preferred embodiment, the web services application is implemented as a JSON web service, exchanging JSON standard format files.

It is contemplated that some remote client devices are stand alone computers operating web browsers including desktop computers, laptop computers, netbook computers and tablet computers while other remote client devices are mobile communication devices. Embodiments are conceived for mobile communication devices which are capable of maintaining a secure communication session with a server through a device specific application other than a web browser.

Current platforms that support device specific applications, known commonly as "apps", include the Google Android OS based smart phone and tablet devices and the Apple IOS based smart phone and table devices. An Android "app" and IOS "app" is further contemplated to implement functions described in this disclosure. Additionally, it is conceived that the "app" interacts with inherent functions of a mobile communication device, such as a camera function or a location function, to accomplish the methods described in this disclosure.

A preferred embodiment of a time management system is shown in FIG. 1. A time manager server 100 executing a web services application is in communication with a database 102 through a network cloud 105. Database 102 comprises a set of job site data 103 wherein the set of job site data 103 further comprises a set of data tables holding a set of data records.

Network cloud 105 comprises a set of interconnected networks including the Internet that routes and transport IP packets from one point to another.

Time manager server 100 is further in communication with a payroll calculator 130 through network cloud 105. In a preferred embodiment, payroll calculator 130 is implemented as an application executed by a computer server to perform a payroll service.

A set of supervisor devices 120 are in communication with time manager server 100 in order to interact with and access the set of job site data 103 in database 102. A subset of supervisor devices may be mobile communication devices executing an administrative application 124. Another subset of supervisor devices are stand alone computing devices operating a web browser 122 to interact with a set of supervisor web pages served by time manager server 100.

A set of employee devices 110 are in communication with time manager server 100 in order to perform time punch functions such as a check-in event and a check-out event at a set of physical job site locations. The set of employee devices 110 generally include a camera feature and a physical location feature such as a GPS location device. A check-in event is the creation of an entering time stamp when an employee reports to a job site. A check-out event is the creation of an exit time stamp when an employee leaves the job site.

A subset of employee devices are mobile communication devices comprising a device application 114. Another subset of employee devices are stand alone computing devices, set up at a physical job site and operating a web browser 112 to interact with a set of employee web pages sewed by time manager server 100.

The set of employee web pages on web browser 112 and the device application are executed to fulfill the functions of the present disclosure such as generating a set of time punch events such as a check-in event and a check-out event, the capture of photos or other biometric data at a check-in and check-out event and the capture of device physical location.

The set of supervisor web pages on web browser 122 and administrative application 124 are executed to fulfill functions of the present disclosure such as managing a job site through obtaining employee time punch data, rounding check-in and check-out times, calculating overtime hours, monitoring overtime hours and approving payment.

Figure 2:
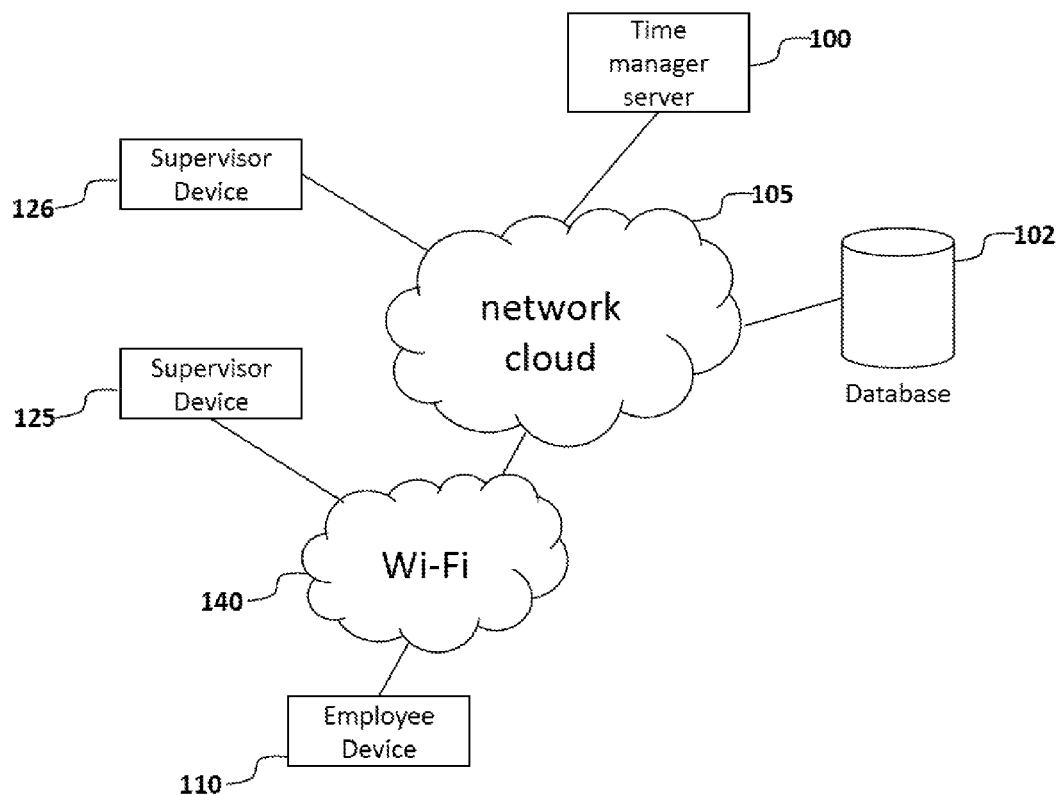
FIG. 2 is a block diagram of an embodiment of a time management system using a Wi-Fi network.

Referring to FIG. 2, an alternate embodiment is shown where communication occurs between the set of employee devices 110 and time manager server 100 through network cloud 105 and a Wi-Fi network cell 140 operating at a job site. It is envisioned that Wi-Fi network cell 140 is limited in range to the physical size of the job site or smaller. In one example, Wi-Fi network cell is limited in range to a small area just inside, a job site entrance gate. It is conceived that an employee device authenticates with Wi-Fi network cell 140 to access time manager server 100 only when in range of Wi-Fi network cell 140 while on a job site. Supervisor device 125 performs jobsite management tasks while on the jobsite through Wi-Fi network cell 140 and network cloud 105. Supervisor device 126 performs jobsite management tasks remotely through network cloud 105.

Figure 3:
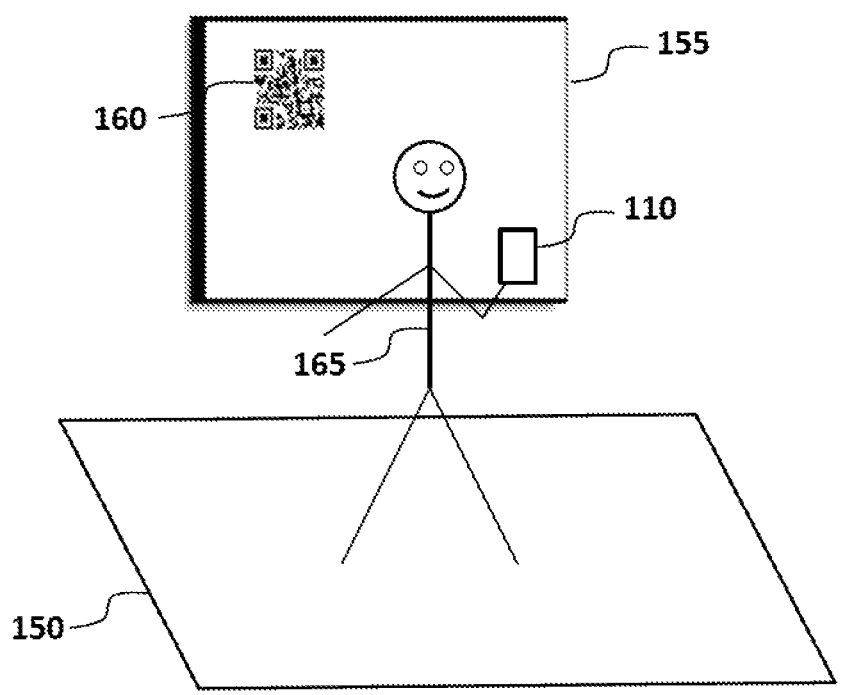
FIG. 3 is a perspective drawing of a landmark at a job site which is used to validate a check-in or check-out event.

Referring to FIG. 3, another alternate embodiment is shown, where a physical check-in area ISO is designated at a job site. Physical check-in area 150 includes landmark 155 further comprising a landmark feature 160 which is distinctive of the physical job site location. It is conceived that an employee device 170, whether stand alone or mobile, is positioned to take a photo of an employee 165 during check-in and check-out that includes an image of landmark feature 160.

In a related embodiment, landmark feature 160 is a 2D bar code, printed on a surface wherein the 2D bar code is encoded with a link to a web page containing job site specific information. For example, the web page could be a weather webpage served by a national weather service for the job site location. The job site specific information can be further correlated to a check-in or check-out time recorded in the set of time punch data.

In operation, the time management system executes on the time manager server, the device application is installed on the set of employee devices and the supervisor application is installed on the set of supervisor devices or available through web browsers accessing the time manager server.

Figure 4:
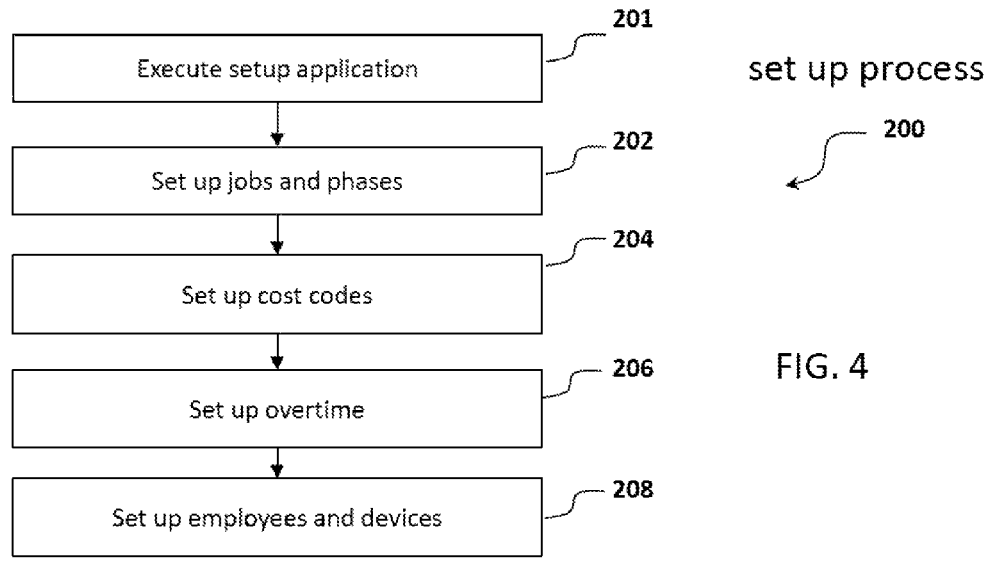
FIG. 4 is a flow chart of set up process in accordance with the present disclosure.

Referring to FIG. 4, a set up process 200 is executed by the time management system. Set up process 200 begins at step 201 where a setup application is executed on the time manager server through a web browser or supervisor application on a supervisor device. The setup application can be limited for access to a preselected group of supervisors, usually a job foreman or administrator, using standard authentication procedures. At step 202, the set of job site data is created in the database. The set of job site data includes physical location information of the job site, supervisor information including a group of supervisor identifiers and a job foreman identifier, a definition of a set of job phases, a work schedule for the job site, and a set of time punch records for the set of employees.

At step 204 a set of cost codes are set up. The set of cost codes are linked to the payroll calculator and to any other financial accounting systems as required to manage payroll for a set of job sites.

At step 206, a set of overtime rules are defined in the payroll calculator and stored in the time manager server for a job site. The set of overtime rules can be made specific to a job site, an employee or to a company. The set of overtime rules also comprise a set of rounding rules for a job site or for an employee.

For example, the set of overtime rules comprise programmed steps that when executed by a processor calculate a number of regular working hours for an employee during a set of work shifts, based on the employee time reported. The set of overtime rules can further comprise steps that determine a set of overtime flag events and respond in some way to the set of overtime flag events. For example, an overtime flag event causes an alert message to be sent to a supervisor device based on an employee reaching an overtime status or reaching a certain number of hours in a time period.

At step 208, a set of employee data for a set of employees and supervisors is received into the database. Step 208 is further explained in FIG. 5.

Figure 5:
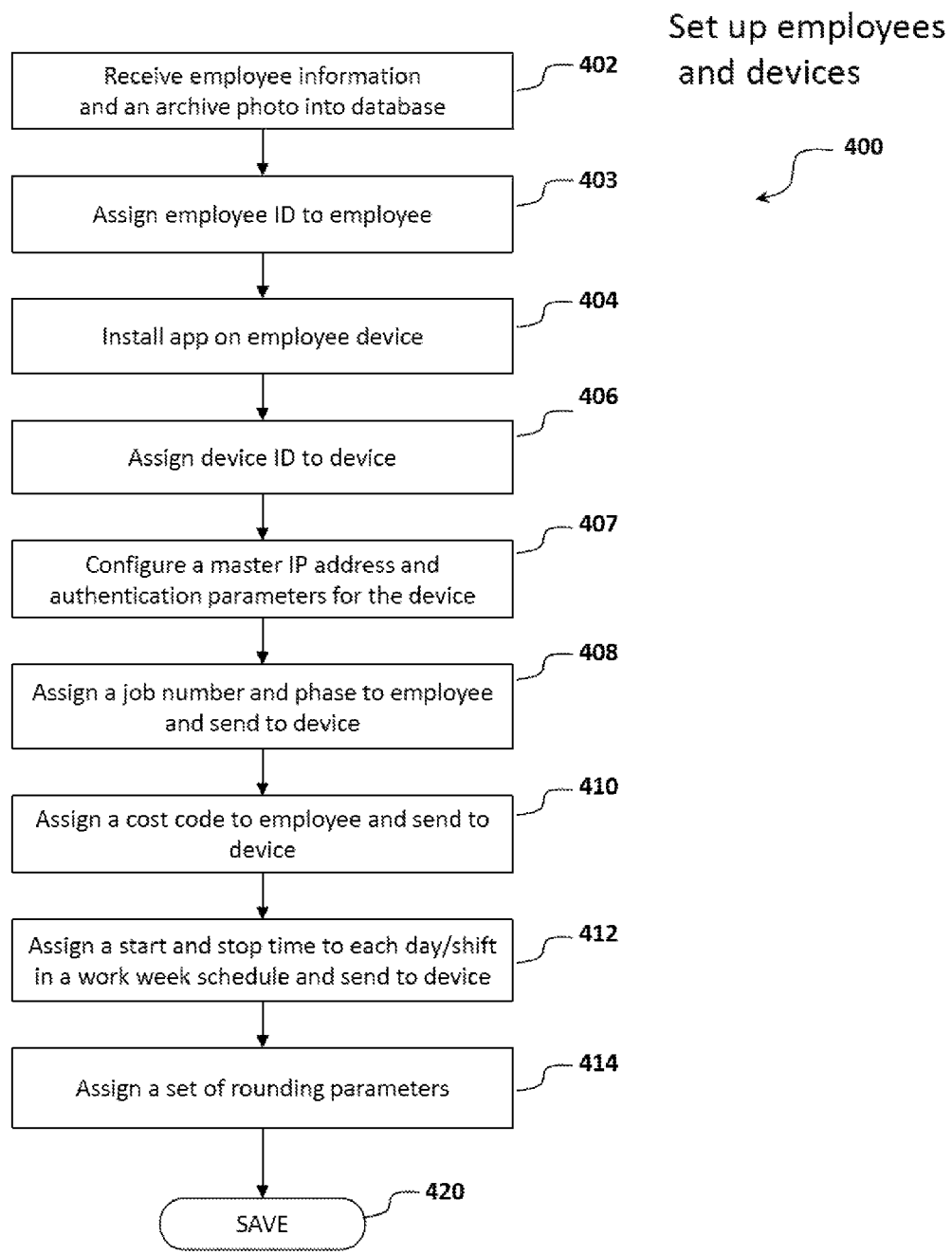
FIG. 5 is a flow chart of a method to set up employees and devices with the time management system.

Referring to FIG. 5, a preferred embodiment of a process 400 to setup employees and devices is described for the time management system. At step 402, employee information is received into the database and an archive photo is taken and stored in the database. Employee information comprises at least the employee's name, address and the archive photo. At step 403, an employee ID is assigned to the employee and added to the employee information in the database. At step 404, a device application is installed on the employee's mobile communication device and, at step 406, the phone number (or other device identifier) is added to the employee information in the database.

At step 407, an authentication mechanism is set up in the device application to authenticate the employee's mobile device with the time manager server. A set of authentication parameters (e.g. username and password) are stored hi the employee information in the database. In another embodiment, the set of authentication parameters are encrypted and stored hi the employee information in the database and in the employee's mobile communication device such that the set of authentication parameters are inaccessible and unknown by the employee. Also, at step 407, a master IP address for the time manager server is stored in the employee's mobile communication device.

At step 408, prior to starting work at a job site, a job number and a job phase is added to the employee information in the database and stored in the employee device. At step 410 a cost code for the job number and job phase is added to the employee information in the database and stored in the employee device. Further to steps 408 and 410, more than one job number, job phase and cost code can be added to the employee information in the database and stored on the employee device.

At step 412 a set of work shift schedules is added to the employee information in the database and stored on the employee device. Each work shift schedule comprises a start time, a stop time and a lunch break time. The lunch break time can also be a lunch break time allotment.

At step 414, a set of rounding parameters are added to the employee information in the database. The set of rounding parameters are used to round the actual check-in and check-out times to a work shift schedule in the set of work shift schedules and include a clock-in early parameter, a clock-in late parameter, a clock-out early parameter and a clock-out late parameter, in use, an early actual check-in time (e.g. 6:50 am) is rounded to the work shift start time (7:00 am) if the actual check-in is within the clock-in early parameter (e.g. 20 mm). A late check-in time will only round to the work shift start time if within the clock-in late parameter (e.g. 2 min). Penalties can be established through additional rounding parameters for late clock-in and early clock-out. Overtime is discouraged by using the set of rounding parameters to calculate check-in and check-out times.

At step 420, the process to set up the employees and devices is completed by saving the employee information to the database.

Figure 6:
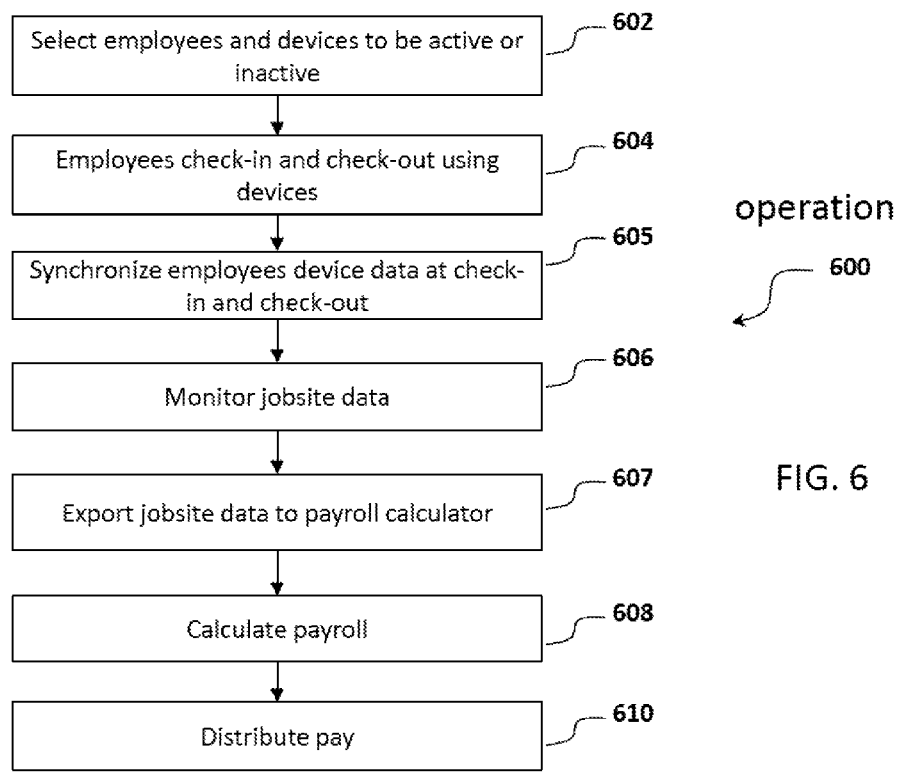
FIG. 6 is a flow chart of an operational process in accordance with the present disclosure.

Referring to FIG. 6, a general operational procedure 600 according to a preferred embodiment is described. The general operational procedure begins at step 602, where an administrative application is started on the time manager server by a job supervisor for a job site. The job supervisor then selects a set of employees to activate for that job site. The job supervisor can also inactivate another set of employees, for example, when a job changes from one phase to the next phase. When at least one employee is active for a job site, then the time manager server begins tracking employee time punch events for the job site as in the steps 604, 605, 606 and 608. When an employee is inactive for a job site, time punch events are not allowed by the employee device for any job numbers associated to that job site.

In an alternate embodiment, a supervisor device associated to the job supervisor communicates with the time management server to accomplish step 602.

At step 604, each employee of the set of employees arrives at the job site and performs a time punch on the employee device which creates a cheek-in event for a work shift. Upon leaving the job site, each employee of the set of employees performs another time punch which creates a check-out event for the work shift. A photo is captured at both the check-in event and the check-out event. A set of time punch data is created on the employee device for the work shift that includes the check-in time and the check-out time, a date, a job number, a job phase, a cost code and a device identifier.

In an alternate embodiment, a stand-alone computer is provided at the job site, for example, as the only mechanism to check-in and check-out or in case an employee does not have their mobile communication device.

At step 605, the set of time punch data is synchronized to the database and stored in the set of jobsite data for the job site. At step 606, the set of jobsite data is accessed by a group of supervisors on a set of supervisor devices to monitor check-in and check-out runes, determine if employees are at then assigned job sites during assigned work shifts, determine regular and overtime hours accumulated, activate employee devices for check-in at a job site, inactivate employee devices for check-in at a job site and so forth. At step 607, the set of job site data is exported to the payroll calculator and at step 608, payroll is calculated for the set of employees based on the set of job site data. At step 610, pay is distributed to the set of employees based on the payroll.

Referring to FIG. 7, a preferred embodiment method of a time punch process at a job site is described. Time punch process 700 begins at step 702, when an employee arrives at a job site for a work shift. The employee is carrying a mobile communication device on which, the device application has been installed and that has been assigned a device identifier by the time manager server, for example, as in process 400. At step 704, the device application is started on the mobile communication device. At step 706, the mobile communication device authenticates with the time manager server, logging the mobile communication device into the time manager server with the device identifier.

Once authenticated, step 708 is performed where the mobile communication device displays a time punch screen including a check-in control, a check-out control, a job number and job description for the job site and work shift to which the employee is checking in. The time punch screen also displays an employee identifier.

At step 709, a time punch event is created when the employee operates the check-in control or the check-out control on the mobile communication device. At step 710, a set of time punch data is stored in the memory of the mobile communication device for the workshift.

Then, at step 712, a camera application is called by the mobile communication device and a picture is taken of the employee. At step 714, the mobile communication device displays the photo and presents an opportunity to accept or reject the photo. If the photo is rejected, then steps 712 and 714 are repeated. If the photo is accepted, then at step 716, the photo and the set of time punch data is pushed to the time manager server and stored in the database in the set of job site data.

Time punch process 700 is repeated for all employees and for all job sites. Many alternate embodiments fitting many different job site situations are possible with the disclosed time management system. Some examples follow.

Figure 7A:
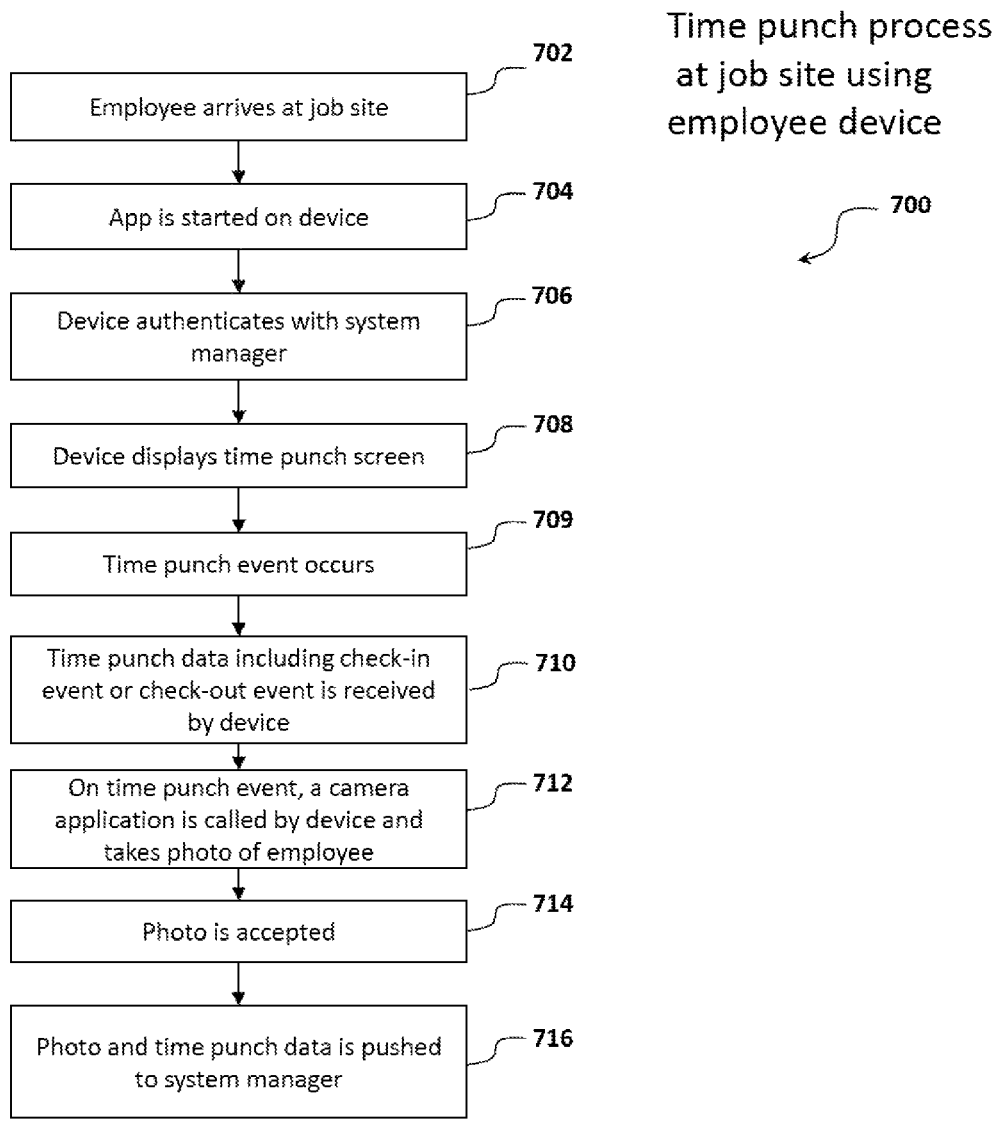
FIG. 7A is a flow chart of a time punch process using an employee device.
Figure 7B:
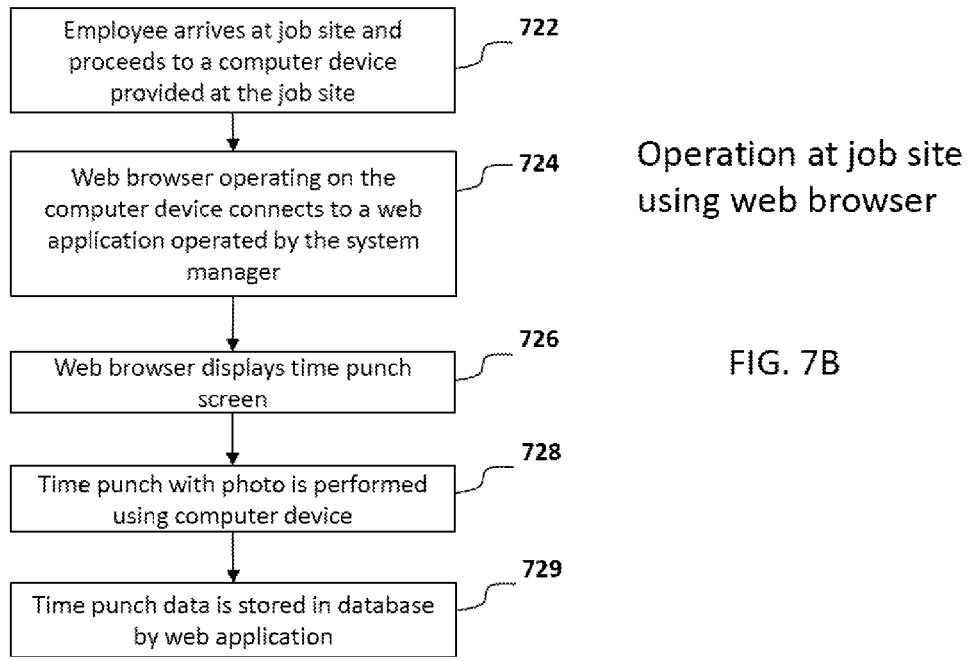
FIG. 7B is a flow chart of a time punch process using a web browser.

Referring to FIG. 7B, a first alternate embodiment of a method of operation is disclosed. This first alternate embodiment is appropriate when, for example, an employee does not have a mobile communication device, forgot to bring his mobile communication device to the job site or the job foreman chooses not to use mobile communication devices for time punch activity.

At step 722, an employee arrives at a job site for a work shift and proceeds to a computer device provided at the job site wherein a digital camera device is connected to the computer device. At step 724, a web browser operating on the computer device is connected to a web application operated by the time manager server. At step 726, the computer device displays an interactive time punch screen through the web application and web browser.

At step 728, a set of time punch data for check-in events and check-out events is created and a photo is taken using the computer device and the digital camera device. At step 729, the set of time punch data and the photo is stored in the database by the web application.

Figure 7C:
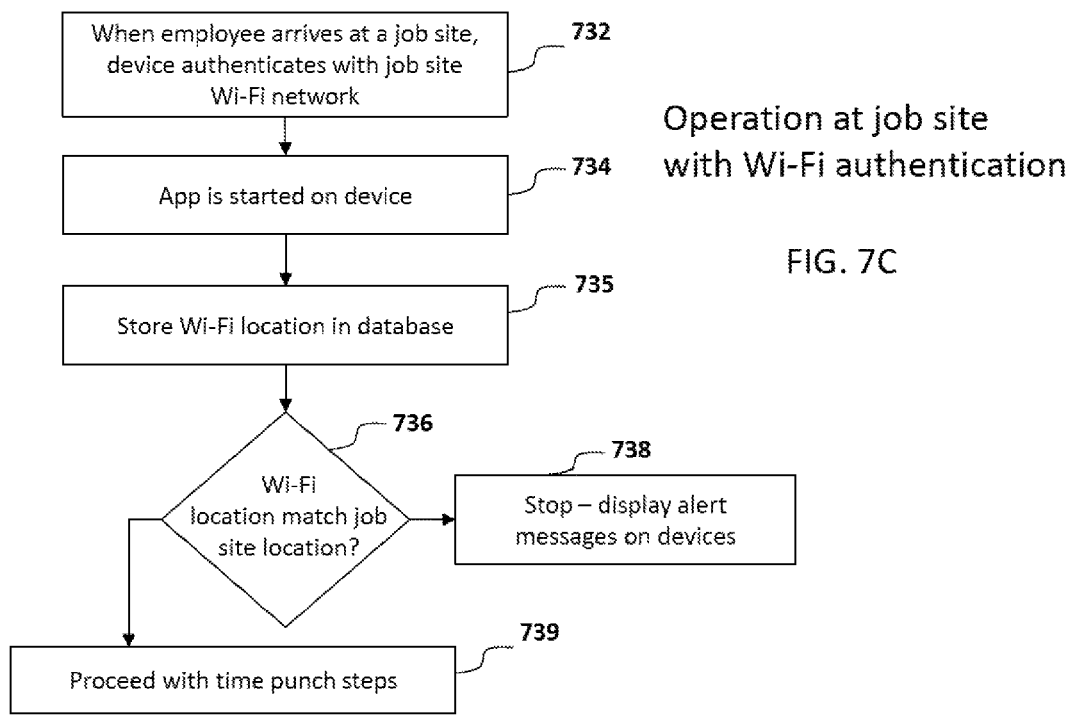
FIG. 7C is a flow chart of a time punch process using Wi-Fi localization.

Referring to FIG. 7C, a second alternate embodiment is disclosed, where the system of FIG. 2 is used in operation. At step 732, when an employee arrives at a job site for a work shift, the employee's mobile communication device authenticates with a job site Wi-Fi network. At step 734, the device application is started on the employee's mobile communication device. At step 735, when the device application is started and authenticates with the time manager server, the time manager server determines the Wi-Fi location from a Wi-Fi network address identified, for example, in a network trace and stores the Wi-Fi location.

If enabled to do so, the time manager server can take immediate action, beginning at step 736, where the time manager server determines if the Wi-Fi location matches the Wi-Fi system at an assigned job site location for the work shift. If the Wi-Fi location matches the assigned job site location, then step 739 is performed to proceed with a time punch process, allowing check-in, check-out events and a photo to be taken and stored in the database. If the Wi-Fi location does not match the assigned job site location, then at step 738, the time manager server directs the device application to display an alert message on the employee's mobile communication device, alerting the employee that his location does not match his assigned job site. At step 738, the time manager server also directs a supervisor application operating on a supervisor device to display an alert message regarding the dislocation of the employee.

Figure 7D:
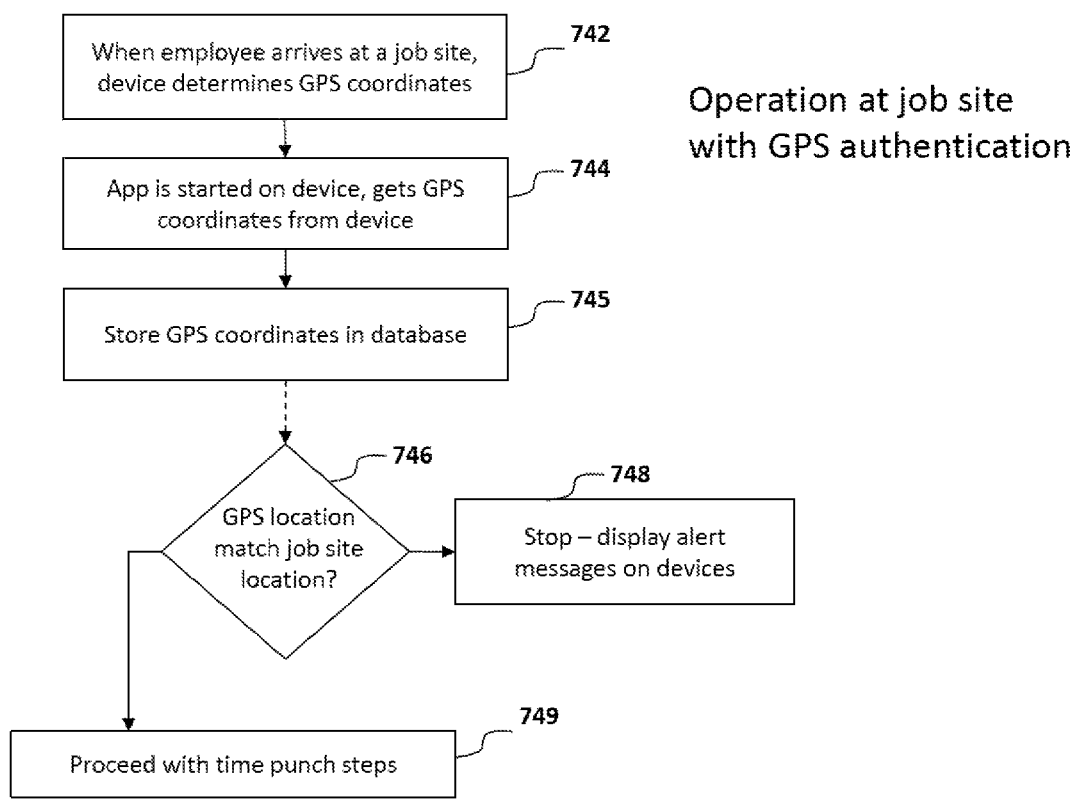
FIG. 7D is a flow chart of a time punch process using GPS localization.

Referring to FIG. 7D, a third alternate embodiment is disclosed, where an employee carries a mobile communication device with a locating function, such as a GPS device. At step 742, when an employee arrives at a job site for a work shift, the employee's mobile communication device determines the device GPS coordinates. At step 744, the device application is started on the employee's mobile communication device and obtains the device GPS coordinates from the GPS device. At step 745, the device GPS coordinates are sent to the time manager server and stored in the database.

If enabled to do so, the time manager server can take immediate action, beginning at step 746, where the time manager server determines if the device GPS coordinates match an assigned job site location for the work shift. If the device GPS coordinates match the assigned job site location, then step 749 is performed to proceed with a time punch process, allowing check-in, check-out events and a photo to be taken and stored in the database.

If the device GPS coordinates do not match the assigned job site location, then at step 748, the time manager server directs the device application to display an alert message on the employee's mobile communication device, alerting the employee that his location does not match his assigned job site. At step 748, the time manager server also directs a supervisor application operating on a supervisor device to display a supervisor alert message regarding the dislocation of the employee. The supervisor alert message can also include detail, such as the employees name, photo, etc to aid the supervisor in resolving the issue.

In an another embodiment, an additional step is included that initiates step 745 wherein the time manager server sends a request for GPS coordinates at any time during a work shift in order to positively locate an employee device. If the GPS coordinates do not match the assigned job location, then step 748 is performed.

Figure 7E:
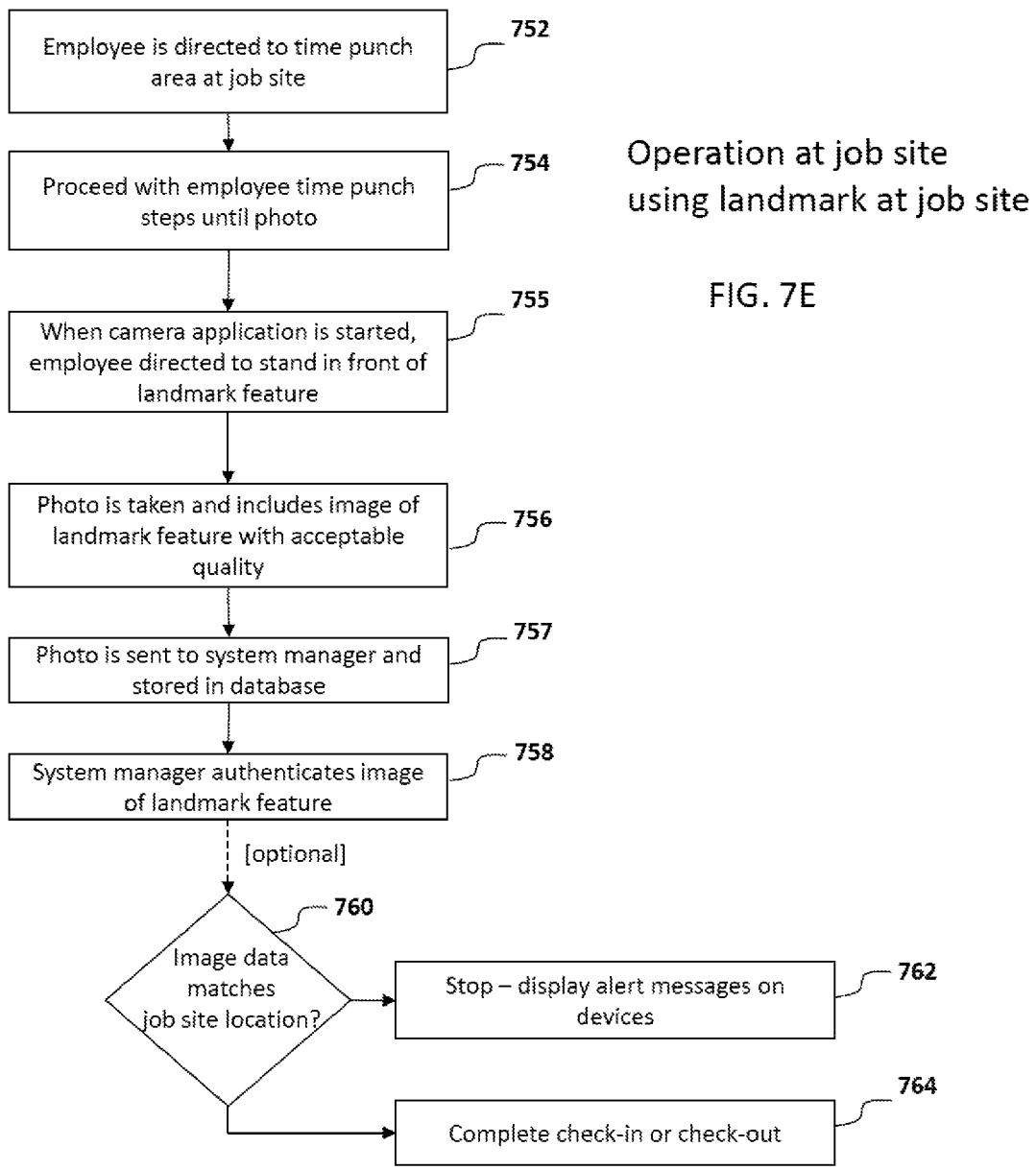
FIG. 7E is a flow chart of a time punch process using a landmark at a job site to validate locality.

Referring to FIG. 7E, a fourth alternate embodiment is disclosed using the system disclosed in FIG. 3. At step 752 an employee arrives at a job site and is directed to a designated area to perform a check-in. At step 754, the employee proceeds with a time punch process, comprising the steps of starting the device application on a mobile device, authenticating the mobile device with the time manager server, submitting a check-in control and having a picture taken by opening a camera application.

At step 755, when the camera application starts, the mobile device displays a message to stand in front of a landmark job site feature at the designated area and to require that a photo be taken that will include an image of the landmark job site feature. At step 756, the photo is taken of the employee alongside the image of the landmark job site feature. At step 757, the photo is sent to the time manager server and stored in the database.

In an alternate embodiment of steps 756 and 757, a job site photo is taken by a fixed on-site camera facing the landmark job site feature, the job site photo sent to the time manager server and stored in the database.

At step 758, the image of the landmark job site feature is authenticated. For example, if the landmark job site feature is a 2D bar code correlated to a web site containing job site information, then the bar code is decrypted and time specific job site data is downloaded from the web site. The time specific job site data is then stored in the database and correlated to the employee time punch data for that day.

The web site containing job site information can be operated by the time management server. Additional information can be uploaded daily to the time management server and included in the specific job site web page, such as daily weather information, daily photos of the job site and so forth. The specific job site web page is accessible from supervisor applications operating on the time management server.

Many landmark job site features are possible. Image recognition and pattern matching can be used to determine job site location by comparing an archived image to the image of the landmark jobsite feature.

If enabled to do so, the time manager server can take immediate action, beginning at step 760, where the time manager server determines if the landmark job site feature matches an assigned job site location. If the landmark job site feature does match the assigned job site location, then step 764 is performed to validate the check-in event.

If the landmark job site feature does not match the assigned job site location, then at step 762, the time manager server directs the device application to display an alert message on the mobile device, alerting the employee to wait for a supervisor and that his location does not match his assigned job site. At step 762, the time manager server also directs a supervisor application operating on a supervisor device to display a supervisor alert message regarding the dislocation of the employee. The supervisor alert message can also include detail, such as the employees name, photo, etc to aid the supervisor in resolving the issue.

The steps 758 and 760 pin the employee's mobile device to a job site location, so the time management system cannot be cheated by authenticating from a different location.

Referring to FIG. 7F, a fifth alternate embodiment is disclosed, where a means for recording employee biometric data is available at the job site, such as a camera, a fingerprint reader, a voice recorder, an eye scanner, etc. This method will also work with an RF-ID reader and RF-ID tag carried by the employee, although using RF-ID tags is not as secure as capturing biometric data.

At step 772, an employee arrives at a job site. At step 774, the employee is directed to proceed with a time punch process, for example, using a device application on a mobile device provided by the employee or using a web application on a computer device provided on the job site. During the time punch process, at step 776, the employee is directed to record a photo or other biometric data. At step 778, the photo or set of biometric data is recorded, sent to the time manager server and stored in the database.

If enabled to do so, the time manager server can take immediate action, at step 780, where the time manager server determines if the photo and set of biometric data matches a pre-existing photo and pre-existing set of biometric data. If a match is determined, then step 784 is performed to proceed to complete the time punch process and allow the employee on the job site. If a match does not exist, then at step 782, the time manager server directs an alert message on a supervisor's mobile device, alerting the supervisor that an issue exists with employee check-in. The alert message can also include detail, such as the employees name, photo, etc to aid the supervisor in resolving the issue.

In another embodiment, where a photo is taken at the job site, electronic facial recognition can be used to determine a match in step 780.

Figure 8:
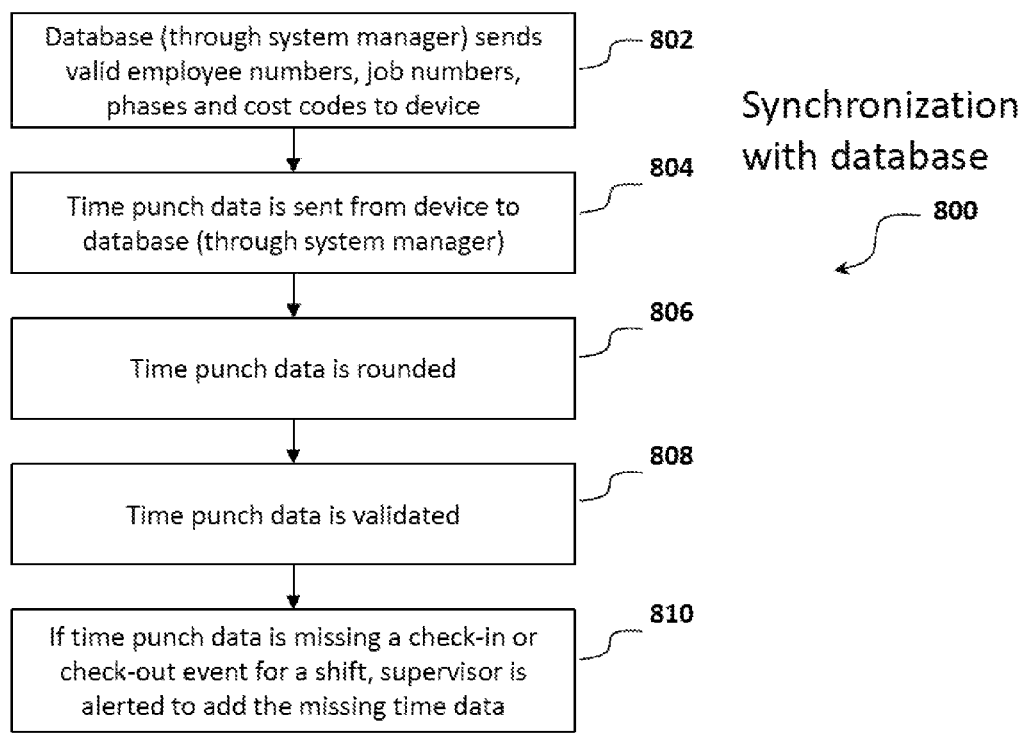
FIG. 8 is a flow chart of a method of synchronization in accordance with the present disclosure.

Referring to FIG. 8, a synchronization method 800 to synchronize a set of time punch data with the database is described. In a preferred embodiment synchronization method 800 is executed automatically.

At step 802, the time manager server sends valid employee numbers, job number, job phases, cost codes and authentication parameters to a set of employee devices from the database. The data sent to the set of employee devices in step 802 is used by those devices to create a set of job site specific time punch events. At step 804 a set of time punch data is sent from the set of employee devices to the time manager server and stored in the database for each work shift in a set of work shifts.

At step 806, the check-in and check-out times hi the set of time punch data is rounded according to each employee's rounding rules.

At step 808, time punch data is validated. For example, at step 808, each employee's time punch record for each work shift in the set of work shifts is checked for a missing check-in or a missing check-out time if at least one of the check-in and check-out times is included in the employee's time punch record. If, at step 808, any data is missing in the employee's time punch record, then at step 810, a supervisor is prompted through a supervisor's device to add the missing time punch data.

Figure 9:
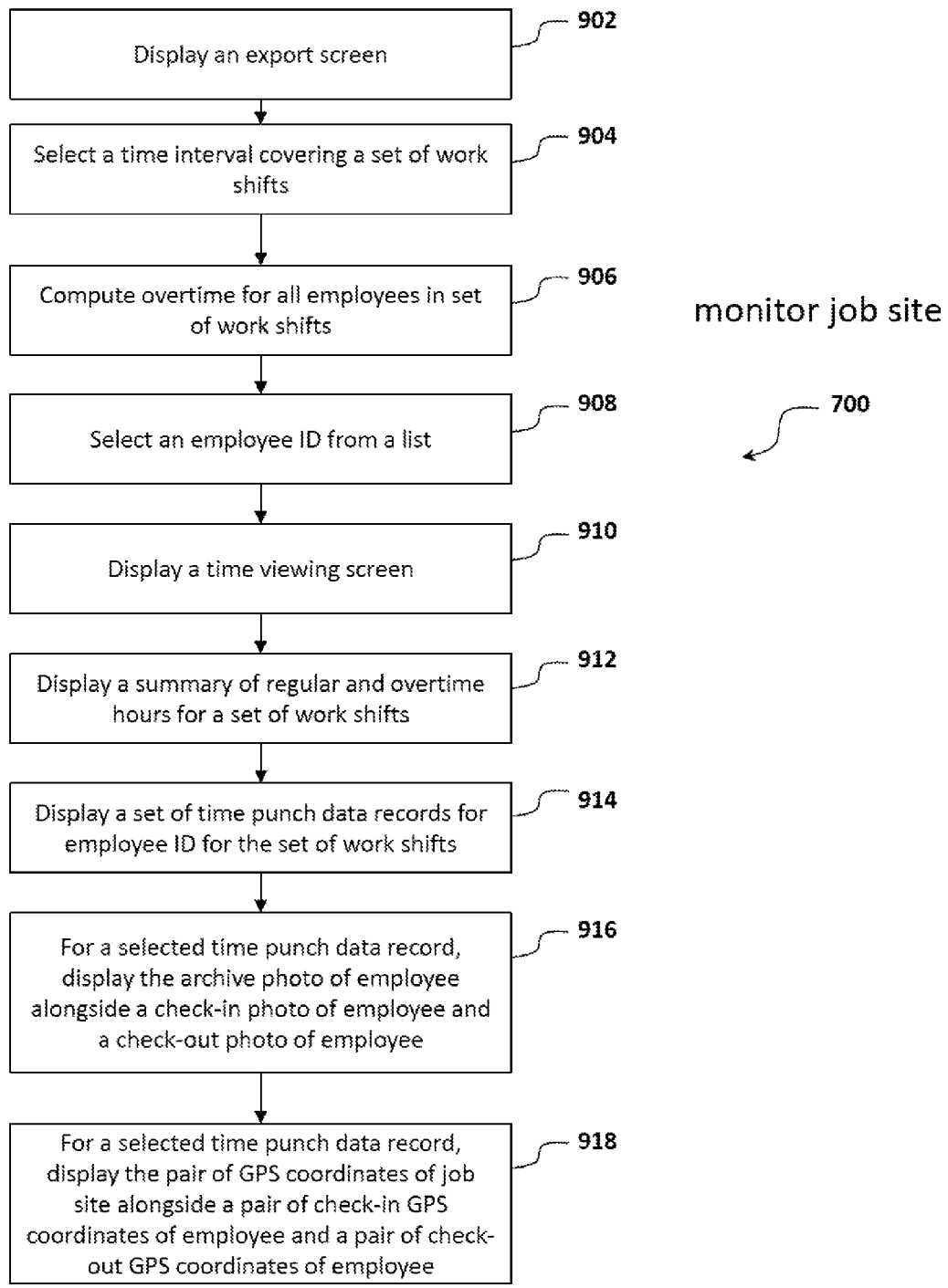
FIG. 9 is a flow chart of a method of monitoring a job site in accordance with the present disclosure.

Referring to FIG. 9, a method 900 for monitoring a job site is disclosed. In a preferred embodiment the steps shown in FIG. 9 are implemented as a web application running on the time manager server, displayed on a web browser and accessible by authenticated supervisors.

At step 902, an export screen is displayed and at step 904, a time interval covering a selected set of work shifts is selected in the export screen. At step 906, a set of overtime hours is computed for the set of employees who worked in the selected set of work shifts. The set of overtime hours are computed from check-in and check-out times and saved in each time punch record for the set of employees.

At step 908, an employee identifier correlated, to a selected employee in the set of employees is selected from a list. At step 910, a time viewing screen is displayed for the selected employee.

At step 912, a summary of regular and overtime hours is displayed for the selected employee for the time interval. For example, if the time interval is a week beginning with a Monday, then the regular and overtime hours are displayed for Monday, the regular and overtime hours are displayed for Tuesday, and so forth through Sunday.

At step 914, a set of time punch records for the selected employee are displayed for the set of work shifts in the time interval. In a preferred embodiment each time punch record, in the set of time punch records, comprises an employee identifier field, an employee name field, a check-in date field, a rounded check-in time field, a check-out date field, a rounded check-out time field, a total hours worked field, an hours code field signifying regular hours or overtime hours, an actual check-in time field, an actual check-out time field, a job number, a job phase identifier, a miscellaneous field, a GPS-in field, a GPS-out field, a photo-in field, a photo-out field and an archive picture field.

If a mobile device was used by the selected employee for a check-in/check-out event, a time punch record is created in the employee device, sent to the time manager server and stored in the database. If the employee used the web application on a web browser, then the time punch record is created by the time manager server and stored in the database.

The employee identifier and name is determined daring the set up process. The check-in/check-out dates and actual check-in/check-out times are populated from the employee device at the job site. The rounded check-in/check-out times are computed from the actual check-in check-out times according to the set of rounding rules. The hours code field is populated during the overtime calculation at step 906. A job number, job phase identifier, CC field and miscellaneous field are determined by a supervisor at the time the employee starts work on the job site and downloaded to the employee device by the time manager server when the device application is started. The GPS-in/GPS-out fields are populated at a check-in/check-out event at the job site as are the photo-in/photo-out fields. A GPS-in field, for example, holds a set of GPS coordinates of the phone taken at the corresponding check-in event. A photo-out field, for example, links to a digital photo taken at the corresponding check-out event. The archive photo field is populated with a link to an archive photo of the selected employee.

At step 916, a time punch record is selected from the set of time punch records for the selected employee. When the time punch record is selected, then an archive photo of the selected employee is displayed alongside the check-in photo and the check-out photo for comparison.

At step 918, a time punch record is selected from the set of time punch records for the selected employee. When the time punch record is selected, then a GPS-jobsite coordinate is looked up for the job number and displayed alongside the GPS-in coordinate and the GPS-out coordinate for comparison, hi a preferred embodiment the GPS-jobsite, GPS-in, and GPS-out coordinates are displayed as pins on a map.

In the prior art, overtime is accumulated and at the end of a work period. For example, if an employee works 50 hours in a one week work period in which regular hours are designated to be 40 hours, then, the remaining 10 hours reported for the one week work period are designated as overtime.

Figure 10:
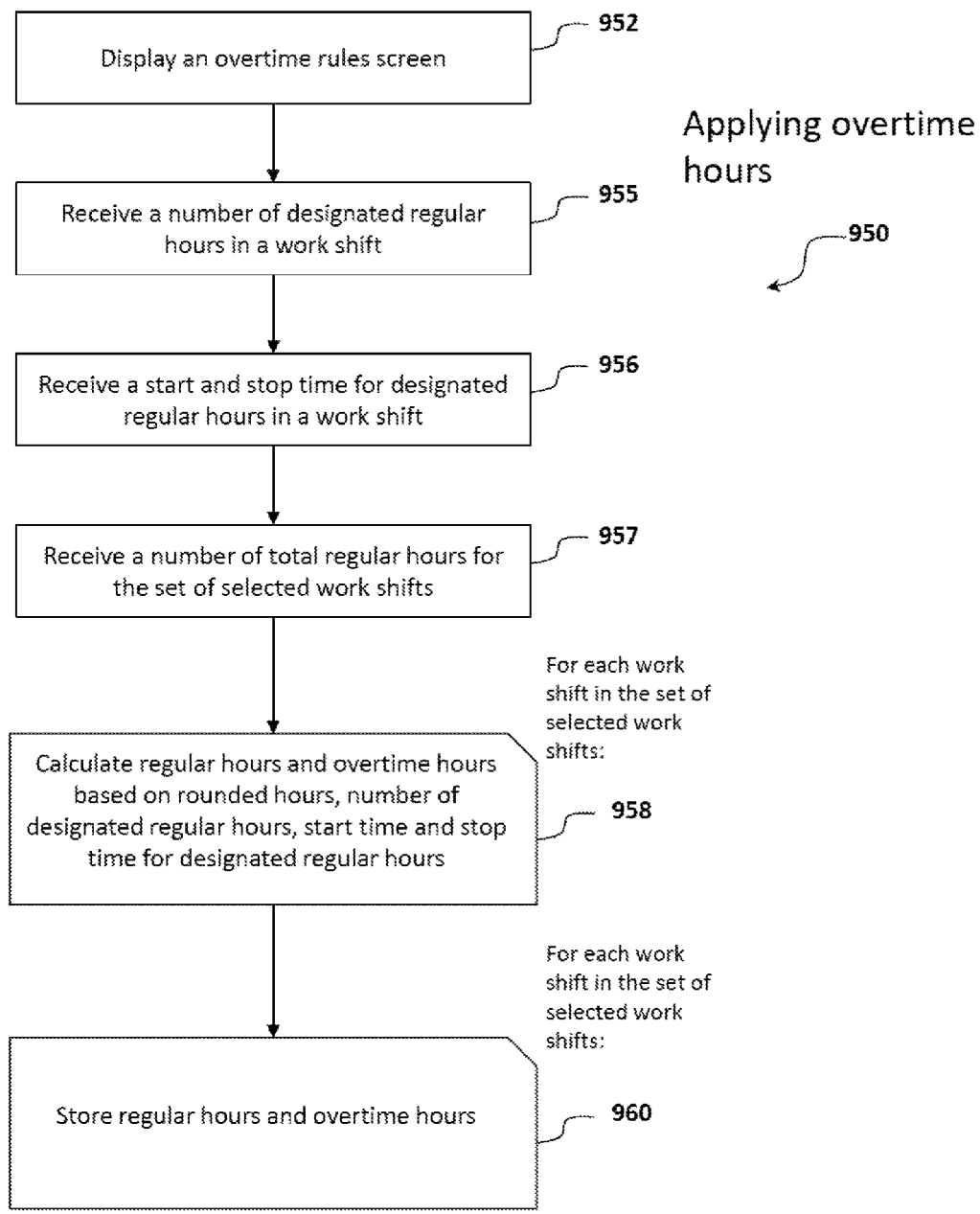
FIG. 10 is a flow chart of a method for applying overtime hours.

Referring to FIG. 10, a method for applying overtime is described according to the present disclosure and based on a set of time punch data records received into the database for an employee. At step 952, an overtime rules screen is displayed as a web application running on the time manager server, displayed on a web browser and accessible by authenticated supervisors.

At step 955, a number of designated regular hours and a set of designated job sites are received for an employee for a work shift. For example, the employee is assigned to a 10 hour Tuesday work shift including 5 hours at a first designated job site and 5 hours at a second designated job site.

At step 956, a start time and stop time designating regular hours is received for a work shift and for the set of designated job sites. For example, the employee is assigned to start a work shift at 7:00 am at the first designated job site, stop at 12:00 pm for lunch, start at the second designated job site at 1:00 pm and finish the work shift at 6:00 pm at the second designated job site.

At step 957, a number of total regular hours for a selected set of work shifts and a selected set of designated job sites is received. For example, the selected set of work shifts is chosen to cover a one week work period for work performed at three designated job sites.

At step 958, a number of overtime hours is allocated across all work shifts in the set of selected work shifts and across all designated job sites according to the rounded horns reported for the employee in the set of time punch data records. The number of overtime hours is allocated using the number of designated regular hours for each work shift, in the set of work shifts, each designated job site, and the start and stop times designating regular hours for each work shift and for each designated job site.

At step 960, for each time punch data record correlated to a work shift and a designated job site, the regular hours for the work shift and the designated job site are stored along with the overtime hours for the work shift and the designated job site in the correlated time punch data record.

Figure 11:
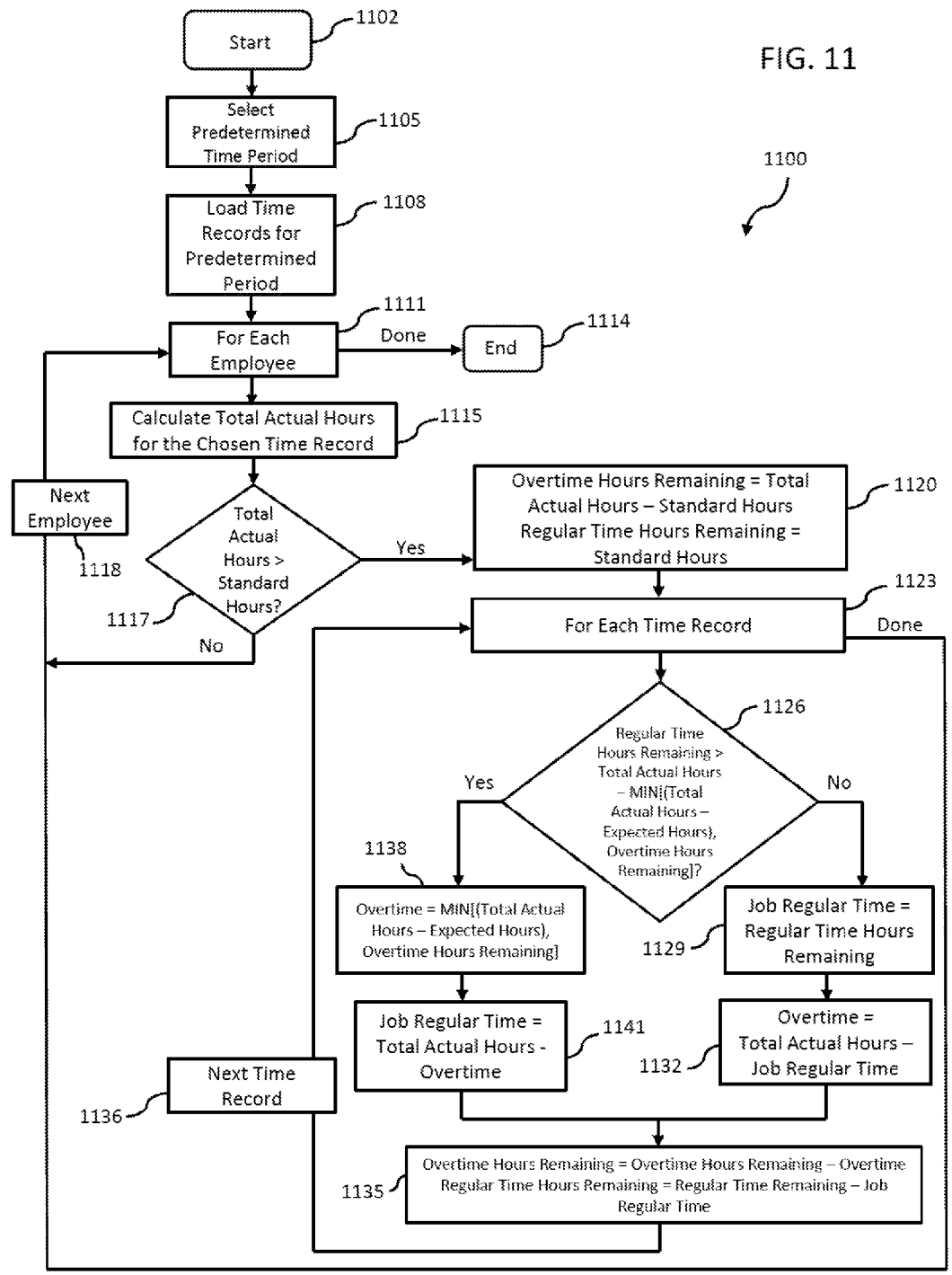
FIG. 11 is a flow chart of a method for allocating overtime hours.

Referring to FIG. 11, step 958 will be further described as method 1100 for allocating overtime hours. At step 1102 the method starts. At step 1105 a predetermined time period is chosen. For example, one week may be used as the predetermined time period. At step 1108, a set of time records for each employee is retrieved from the database for the predetermined time period. In a preferred embodiment, the set of time records is time punch data and includes a set of expected hours and a set of actual hours for each employee, for each job and for each day in the predetermined time period. The set of expected horns is a number that represents an estimate of the number of hours that management expects each job to take for that day for that employee. The set of actual hours is the number of hours that the employee reports on his time card for each job for each day.

At step 1111, the system chooses a subset of time records for one employee from the set of time records. If all employee records have been examined, then the system ends at step 1114. If not, the system moves to step 1115. At step 1115, "total actual hours" is calculated for each chosen employee across the set of time records. In a preferred embodiment, total actual hours is calculated by summing the entries of actual hours on each time card by a given employee across the predetermined time period.

At step 1117, the number of total actual hours is compared to a variable representing number of "standard hours" for a legal work week. In a preferred embodiment, the number of standard hours for a legal work week is 40, but it can be others. If the total actual hours is less than the standard hours, the system advances to tire next employee record at step 1118 and returns to step 1111. If the number of total actual hours is greater than the standard hours, then the system moves to step 1120.

At step 1120, the decrement counter "overtime horns remaining" is set to the number of total actual hours minus the standard hours. Also in step 1120, the decrement counter "regular time hours remaining" is set to the number of standard hours.

At step 1123, the system chooses a first time record for the employee. In a preferred embodiment, the time records are processed in job order, then date order.

At step 1126, a conditional statement is examined according to the following equation:

$$\text{Regular Time Hours Remaining} > \text{Total Actual Hours} - \text{MIN [(Total Actual Hours} - \text{Expected Hours), Overtime Hours Remaining]} \quad \text{Eq. 1}$$

The variables in the equation are set as previously described. The value of the "expected hours" is the value for the current record. The "MIN" function chooses the lowest value of the set of variables within the brackets.

If, at step 1126 the conditional statement is false, then the system moves to step 1129. At step 1129, the variable "job regular time" is set to the value of the decrement counter regular time hours remaining. At step 1132, the variable "overtime" is calculated by subtracting the value of job regular time from the value of total actual hours. At step 1135, decrement counter overtime hours is decremented by the value of the variable overtime. Also, the decrement counter regular time hours remaining is decremented by fee value of job regular time. The system then advances to the next time record at step 1136 and returns to step 1123.

If, at step 1126 the conditional statement is true, then the system moves to step 1138. At step 1138, the system calculates overtime by executing the equation below;

$$\text{Overtime} = \text{MIN [(Total Actual Hours} - \text{Expected Hours), Overtime Hours Remaining]} \quad \text{Eq. 2}$$

The variables in the equation are set as previously described. The value of the "expected hours" is the value for the current record. The "MIN" function chooses the lowest value of the set of variables within the brackets.

At step 1141, the variable job regular time is calculated by subtracting the value of overtime from the value of total actual hours. The system then moves to step 1135 and resumes operation as previously described.

Referring to FIGS. 12A-12C, three examples are shown as a set of time records for employees 1202, 1204, and 1206. In each example, column 1211 shows the designated job number. Column 1212 shows the designated weekday for each record. Column 1213 shows the number of expected hours estimated for each job and for each day. Column 1214 shows the number of actual hours recorded in the time punch data by the employee for each job and for each day. Column 1216 shows the calculated variable job regular time for each record. Column 1218 shows the calculated value of overtime for each record. Column 1220 shows the value of the decrement counter overtime hours remaining as the records are processed. Column 1221 shows the value of the decrement counter regular time hours remaining as the records are processed.

The present invention is not intended to be limited by any particular embodiment disclosed. For example, combinations of the alternate embodiments disclosed in FIGS. 7A-7F axe possible.

It will be appreciated by those skilled in the art that changes could be made to the exemplary embodiments described above without departing from the broad inventive concept thereof. It is understood, therefore, that this invention is not limited to the particular embodiments disclosed, but it is intended to cover modifications within the spirit and scope as defined by the appended claims.

The invention claimed is:

1. A method of employee time management at a set of job sites on a time management server, the method comprising:
   authenticating, by the time management server, an employee device;
   receiving, by the time management server, an employee image from the employee device in response to a time punch event, the employee image pertaining to the time punch event;
   receiving, by the time management server, location information pertaining to the employee device in response to the time punch event, the location information comprising location data of the employee device at the time punch event;
   comparing, by the time management server, the location information to an expected job site location to determine a location match condition;
   generating, by the time management server, a set of time punch data for a work shift for the expected job site location when the set of location information matches the expected job site location;
   comparing, by the time management server utilizing electronic facial recognition, the employee image to an archived image to derive an employee match condition;

validating, by the time management server, the set of time punch data using the employee match condition; and deriving, by the time management server, a payment amount based on the set of time punch data, the location match condition, and the employee match condition, wherein the location information comprises a WI-FI location address pertaining to the location data of the employee device at the time punch event, wherein comparing the location information further comprises comparing the WI-FI location address pertaining to the location data of the employee device at the time punch event with a WI-FI address location pertaining to the expected job site location to determine a location match condition; and when the WI-FI location address pertaining to the location data of the employee device at the time punch event does not match the WI-FI address location pertaining to the expected job site location, generating an alert message via the time management server indicating that the location data of the employee device does not match the expected job site location.

2. The method of claim 1 further comprising: receiving the archived employee image; receiving a check-in image related to a beginning time punch event receiving a check-out image related to an ending time punch event; displaying the archived employee image adjacent the check-in image and the check-out image.

3. The method of claim 1 further comprising: receiving a check-in employee location at a beginning time punch event; receiving a check-out employee location at an ending time punch event; displaying the expected job location adjacent the check-in location and the check-out location.

4. The method of claim 1 further comprising: defining a set of overtime parameters; defining a set of rounding parameters; rounding a set of check-in times and a set of check-out times, based on the set of rounding parameters; and, computing a sum of regular hours and a sum of overtime hours for the set of work shifts from the set of check-in times, the set of check-out times and the set of overtime parameters.

5. The method of claim 4 further comprising the step of: allocating the sum of overtime hours to each job site, in the set of job sites.

6. The method of claim 4 further comprising the step of: allocating the sum of overtime hours to each work shift, in the set of work shifts.

7. The method of claim 1 further comprising: receiving a biometric reading; and comparing an archived biometric reading to the biometric reading.

8. The system of claim 1 wherein the location information comprises Global Positioning System (GPS) coordinates pertaining to the location data of the employee device at the time punch event, wherein comparing the location information further comprises comparing the GPS coordinates pertaining to the location data of the employee device at the time punch event with a GPS coordinates pertaining to the expected job site location to determine a location match condition; and when the GPS coordinates pertaining to the location data of the employee device at the time punch event does not match the GPS coordinates pertaining to the expected job site location, generating an alert message via the time management server indicating that the location data of the employee device does not match the expected job site location.

9. A system for employee time management for an employee, comprising:

an employee device having a first processor and an image sensor;

a computer server connected to the employee device, the computer server comprising a second processor executing a first set of program instructions;

a second set of program instructions, installed in the employee device, that when executed, directs the employee device to:

authenticate the employee device with the computer server;

generate a set of time punch data for a set of work shifts at a set of job sites;

generate employee location information pertaining to the employee device for at least one job site of the set of job sites;

capture a set of onsite images at the image sensor, each onsite image of the set of onsite images comprising an employee image;

send the set of time punch data and the set of onsite images to the computer server;

the first set of program instructions, that when executed, further directs the computer server to:

authenticate with the employee device;

receive the set of onsite images and the set of time punch data into the first memory;

compare the employee location information to an assigned job site location to determine a location match condition;

validate the set of time punch data using the location match condition;

compare, utilizing electronic facial recognition, the employee image to an archived image to derive an employee match condition; and allocate a number of regular hours and a number of overtime hours to each work shift in the set of work shifts and to each job site in the set of job sites based on the location match condition, the employee match condition, and the set of time punch data, wherein the employee location information comprises a WI-FI location address pertaining to the at least one job site, wherein the first set of program instructions, that when executed, further directs the computer server to: compare the WI-FI location address pertaining to the at least one job site with a WI-FI address location pertaining to the assigned job site to determine a location match condition; and when the WI-FI location address pertaining to the at least one job site does not match the WI-FI address location pertaining to the assigned job site, causing the first set of program instructions, when executed, to generate an alert message indicating that the at least one job site does not match the assigned job site.

10. The system of claim 9 further comprising: a supervisor device connected to the computer server; a third set of program instructions stored on the supervisor device, that when executed by a third processor, directs the supervisor device to: monitor the set of time punch data; display a first alert signal on the supervisor device when the employee location does not match the assigned job site; display the set of onsite images; display the number of regular hours and the number of overtime hours; and, display a second alert signal on the supervisor device if when the number of regular hours surpasses a predefined limit.

11. The system of claim 9 wherein the first set of program instructions, that when executed, further directs the computer server to: activate the employee device for check-in at a first job site in the set of job sites; and inactivate an employee device for check-in at a second job site in the set of job sites.

12. The system of claim 9 wherein the third set of program instructions, that when executed by the third processor on the supervisor device, further directs the supervisor device to communicate with the computer server to: activate the employee device for check-in at a first job site in the set of job sites; and, inactivate an employee device for check-in at a second job site in the set of job sites.

13. The system of claim 9 further comprising: a set of overtime parameters further comprising a predetermined allocation of overtime hours; a set of rounding parameters; and, wherein the first set of program instructions further directs the computer server to: round a set of check-in times and a set of check-out times, from the set of time punch data for the set of work shifts, based on the set of rounding parameters; compute a sum of regular hours and a sum of overtime hours for the set of work shifts from the set of check-in times, the set of check-out times and the set of overtime parameters; and, allocate the sum of overtime hours to the set of work shifts and the set of job sites in the predetermined allocation.

14. The system of claim 9 wherein the employee location information comprises Global Positioning System (GPS) coordinates pertaining to the at least one job site, wherein the first set of program instructions, that when executed, further directs the computer server to: compare the GPS coordinates pertaining to the at least one job site with GPS coordinates pertaining to the assigned job site to determine a location match condition; and when the GPS coordinates pertaining to the at least one job site does not match the GPS coordinates pertaining to the assigned job site, causing the first set of program instructions, when executed, to generate an alert message indicating that the at least one job site does not match the assigned job site.

* * * * *